350-6.4 SR
XR 2,928,952
OSS REFERENCE SEARCH ROOM
123 E
(250)

March 15, 1960 F. L. BEDNARZ 2,928,952

OPTICAL SCANNING SYSTEM

Filed Aug. 20, 1958 2 Sheets-Sheet 1

INVENTOR.
FELIX L. BEDNARZ
BY [signature]
ATTORNEYS

2928952
OR IN 250/216

March 15, 1960 F. L. BEDNARZ 2,928,952
OPTICAL SCANNING SYSTEM
Filed Aug. 20, 1958 2 Sheets-Sheet 2
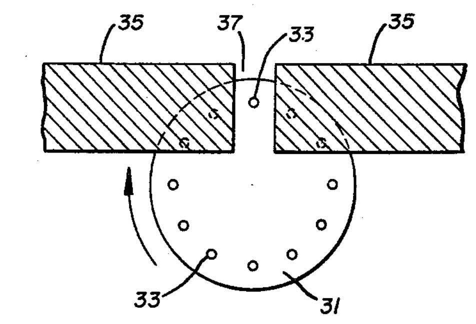
FIG. 2
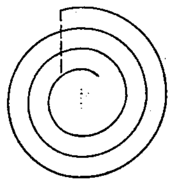
FIG. 5
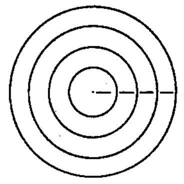
FIG. 6
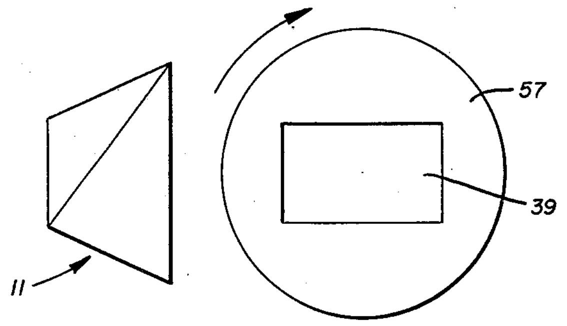
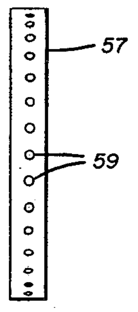
FIG. 3A FIG. 3B
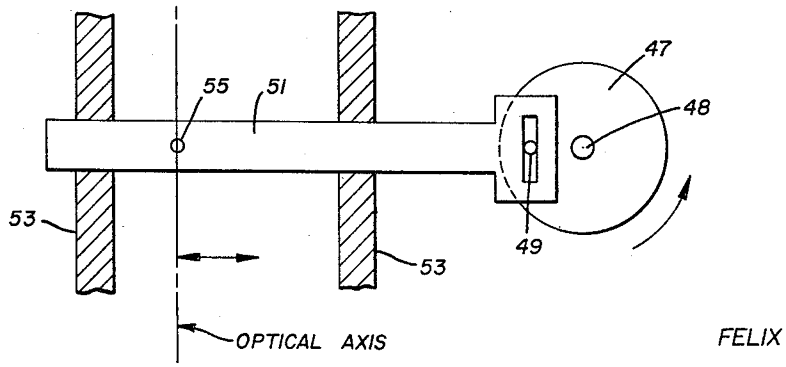
FIG. 4
INVENTOR.
FELIX L. BEDNARZ
BY
ATTORNEYS

United States Patent Office 2,928,952

Patented Mar. 15, 1960

2,928,952

OPTICAL SCANNING SYSTEM

Felix L. Bednarz, Ojai, Calif., assignor to Curtis Laboratories, Inc., a corporation of California Application August 20, 1958, Serial No. 756,228

6 Claims. (Cl. 250—216)

This invention relates to a scanning system, and more particularly relates to a mechanical-optical scanning system having extremely high resolution.

Conventional scanning systems using electronic components such as the orthicon, image dissector and image orthicon, are capable of extremely rapid scanning but none of them is capable of high resolution. In all of these systems, an electron beam is employed which performs the actual scanning operation and the size of the beam is necessarily so large that high resolution is not obtained. Thus, the need still exists for extremely high resolution scanning systems.

The scanning system of the present invention ordinarily scans at relatively low rates, say thirty frames per second, but this is adequate for many purposes. For instance, in scanning microfilms, a conventional television scanning system is inadequate because of its poor resolution, while the present invention easily lends itself to such an application. In addition to the lack of resolution caused by the size of the electron beam, many of the conventional television scanning systems employ a photosensitive mosaic which presents a further limitation of resolution.

In conventional photoelectric cells, a serious defect arises from the fact that it is impossible to provide an absolutely uniform response from the photosensitive surface. Thus, various parts of the surface respond in a non-uniform manner to a given light stimulus, causing conventional television systems to suffer from a lack of contrast, or, in electronic terms, a low signal to noise ratio. On the other hand, the photocell utilized in accordance with the present invention is not located at the focal plane, but is sufficiently removed therefrom that a relatively large area of the cell is utilized at any given instant, averaging out in the differences in the output of various portions of the cell area.

In general, the objects of the present invention are achieved by providing a rotating inverting prism, preferably of the Pechan type, together with a translating member whereby the combination of the rotating prism and the translating member breaks the field into a series of dots or lines, the image falling upon a photoelectric cell to provide the output of the system.

As has been pointed out above, a prism is used which is rotated around the optical axis of the incident light so that any point, off center of the optical axis, would appear to describe a circle when viewed at the focal plane of the device. Conversely, a fixed point at the focal plane would scan a circular pattern in the object plane. By providing a translating member an area is scanned at the focal plane. Thus, if the translating member gradually advances by the distance of the diameter of its hole at each revolution of the prism, a spiral path will be traced and an area scanned. If the translating device advances the hole in a stepwise manner, a series of concentric circles will be scanned.

A Pechan prism is preferred since the prism possesses mechanical symmetry around its optical axis and does not introduce any errors into the optical system which cannot be corrected by the lens system. However, other prisms can be used which invert the image in one plane.

In the drawings forming a part of this application:

Figure 2 is a partial reduced diagrammatic view on the lines 2—2 of Figure 1.

Figure 3A is a plan diagrammatic view of an alternate translating mechanism using a drum and Figure 3B is a side view of the drum shown in Figure 3A.

Figure 4 is a diagrammatic view of another alternate form of translating mechanism employing a reciprocating bar.

Figure 5 is a diagram of the spiral scan produced by the device of Figure 1.

Figure 6 is a diagram of another scanning pattern which may be employed.

Figure 7 is a diagram of another form of prism which can be substituted for the Pechan prism 11 of Figure 1.

Figure 1:
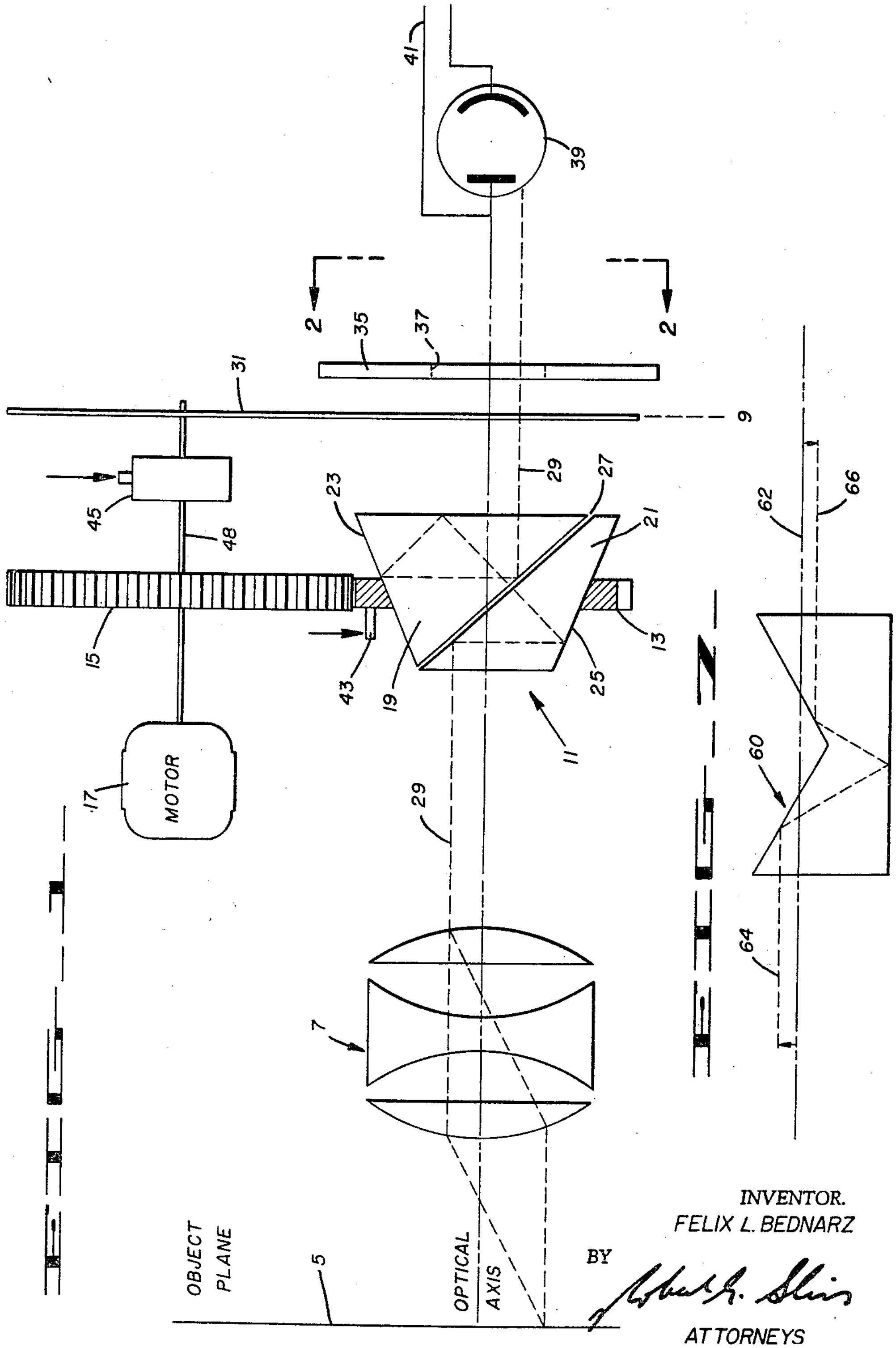
Figure 1 is a diagrammatic view of a preferred embodiment of the invention employing a scanning disc as the translating element.

Referring now particularly to Figures 1 and 2, there is shown a diagram of a preferred scanning mechanism made in accordance with the present invention. Light from the object plane 5 passes through the lens 7 where it is focused at the focal plane 9. As the light passes to the focal plane, it is intercepted by the Pechan prism 11. The Pechan prism 11 is mounted in the center of the gear 13 which meshes with gear 15 which is driven by motor 17 having a shaft 48. Obviously, the gear must be provided with a centerless rotational support, not illustrated. Thus, the prism 11 is rotated by means of the motor around its optical axis. The Pechan prism 11 consists of two elements 19 and 21 having mirrored sides 23 and 25, respectively, and an interface 27. It is the property of a Pechan prism that light be inverted in one plane. Thus, every off-center ray coming from the object plane would appear to describe a circle at the focal plane because of the rotation of the prism 11. The path of such a ray is shown at 29 in dashed lines. In order to break up the light from the object plane into a series of dots, or, more properly, lines, a small aperture or hole must be used and means must be provided for translating the hole in order that an area can be scanned. In the embodiments illustrated in Figures 1 and 2, the translating device consists of a scanning disc. The scanning disc 31 is also driven by the motor 17 and thus is perfectly synchronized with the movement of gear 13 and prism 11. The scanning disc 31 is in the focal plane 9 and consists of the disc having a series of holes 33 therein having a common radial distance. In front of the scanning disc 31 is placed an opaque plate 35 having a central opening 37 therein so that only a single one of the holes 33 is exposed at one time. Located on the optical axis and behind the plate 35 is a photocell 39 for picking up the light which passes through the scanning disc. The current from the photocell 39 passes through the wires 41 to a suitably modified receiver such as a television set. The device thus described traces out a series of spiral paths, as is shown in Figure 5. It is obvious that the prism 11 should rotate substantially faster than the disc 31. As the prism 11 makes one half revolution, the disc 31 should advance only the distance representing the diameter of the individual holes in the disc in order that continuous coverage, without overlap, be provided of the subject. The slightly curved path can be compensated for electronically in the receiving equipment.

In the drawing, the gear 13 is shown as substantially smaller than gear 15, and in actual practice the difference would be even greater than that illustrated. In the system thus described, it is easy to pick up synchronized signals by purely mechanical means. Thus, by merely providing a contactor 43 on the gear 13 one can pick up a synchronizing pulse each time the prism rotates and by providing a suitable contactor 45 on the shaft of the motor 17, a synchronizing pulse can be obtained each time the disc 31 rotates.

In Figure 7 a typical alternate form of prism is shown. The prism 60 is rotated on its optical axis 62. An off-center beam of light 64 enters the prism, is deflected along the path shown, and emerges at 66.

Because of its simplicity, the scanning disc 31 is preferred, but other means can be used for breaking up the light coming from the Pechan prism. In Figure 4, there is illustrated an oscillating plate wherein a cam plate 47 is provided on the shaft 48 of motor 17 having a pin 49 thereon. This causes the plate 51 to oscillate in the guides 53 so that the spot 55 in the plate 51 translates with a sine wave motion.

Another form of translating device is shown in Figures 3A and 3B wherein a rotating drum 57 having a series of peripheral holes 59 is rotated around the photocell 39. The rotating drum provides an almost uniform velocity with no curvature of the path, and the slight lack of perfect uniformity of velocity can be electronically or optically compensated for.

A scanning device made in accordance with the present invention has extremely high resolution as contrasted with conventional electronic scanning systems. Thus, conventional systems have a minimum practical spot size of about .005", while the system of the present invention permits a spot size as small as .0003".

I claim:

1. A scanning device comprising means for focusing an image of an object on a focal plane, an inverting prism mounted between the focal plane and said object, means for rotating the prism around its optical axis and means for translating a small aperture in the rotating image thus produced and a photocell located on the optical axis for picking up a signal from the translated beam.

2. The device of claim 1 wherein the translating means comprises a scanning disc, said scanning disc having a series of holes therein having a common radial distance.

3. The device of claim 1 wherein the translating means comprises a drum rotating around the photocell having a series of peripheral holes therein.

4. The device of claim 1 wherein the translating means comprises a reciprocating arm with a small aperture therein.

5. The device of claim 1 wherein a synchronizing signal is picked up from the rotation of one of the parts.

6. The device of claim 1 wherein the prism is of the Pechan type.

References Cited in the file of this patent

UNITED STATES PATENTS

| | | |
|---|---|---|
| 1,926,824 | Stogoff | Sept. 12, 1933 |
| 2,376,311 | Hood | May 15, 1945 |
| 2,405,731 | Beggs et al. | Aug. 13, 1946 |
| 2,454,959 | Barnes | Nov. 30, 1948 |
| 2,641,956 | Morrison et al. | June 16, 1953 |
| 2,650,307 | Koppius | Aug. 25, 1953 |
| 2,678,580 | Erban | May 18, 1954 |
| 2,855,521 | Blackstone | Oct. 7, 1958 |